May 19, 1942.  H. M. HUSK  2,283,256
COOKING MACHINE
Filed May 18, 1939  4 Sheets-Sheet 1
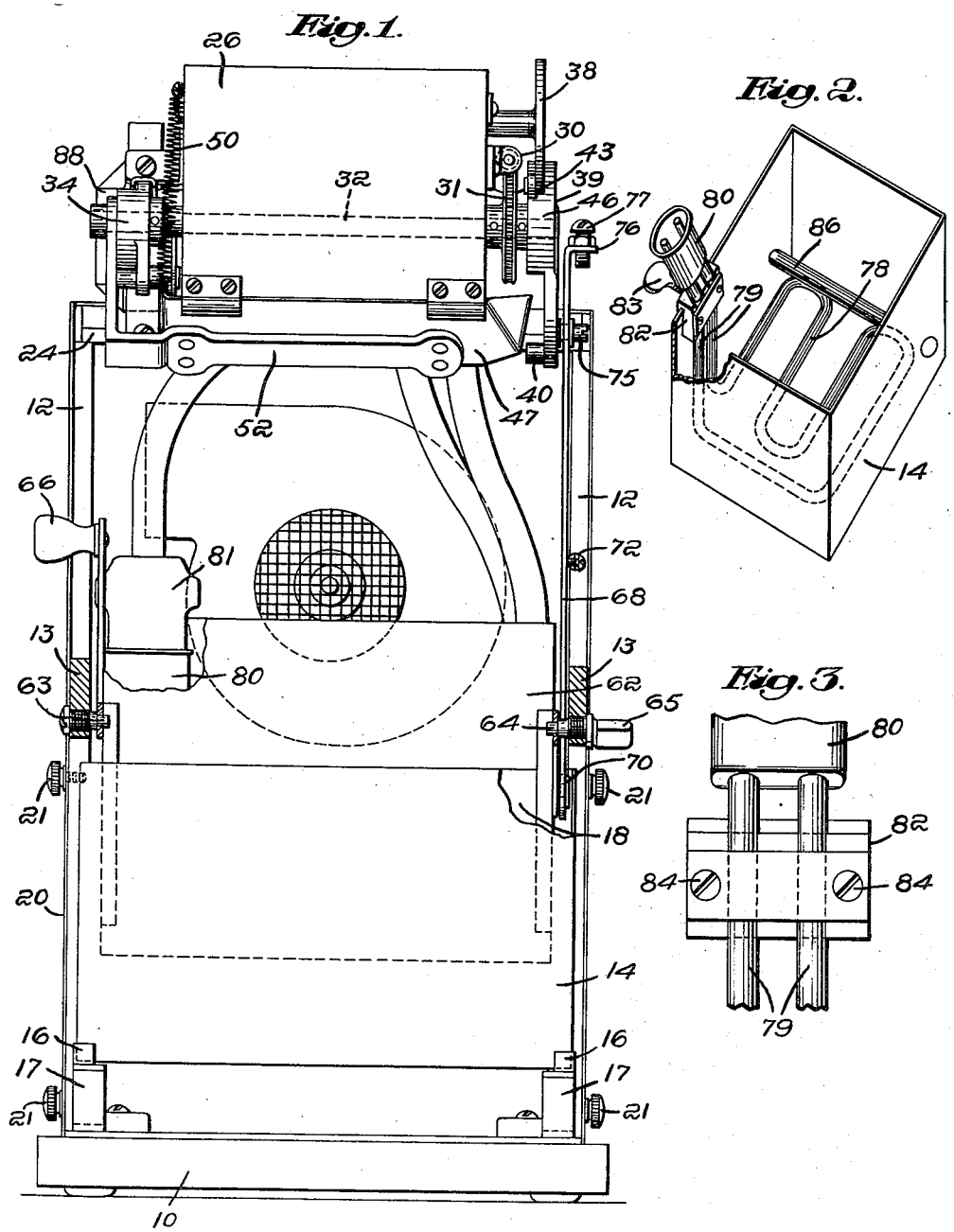
Inventor:
Harry M. Husk,
by Kenway + Witter
Attorneys

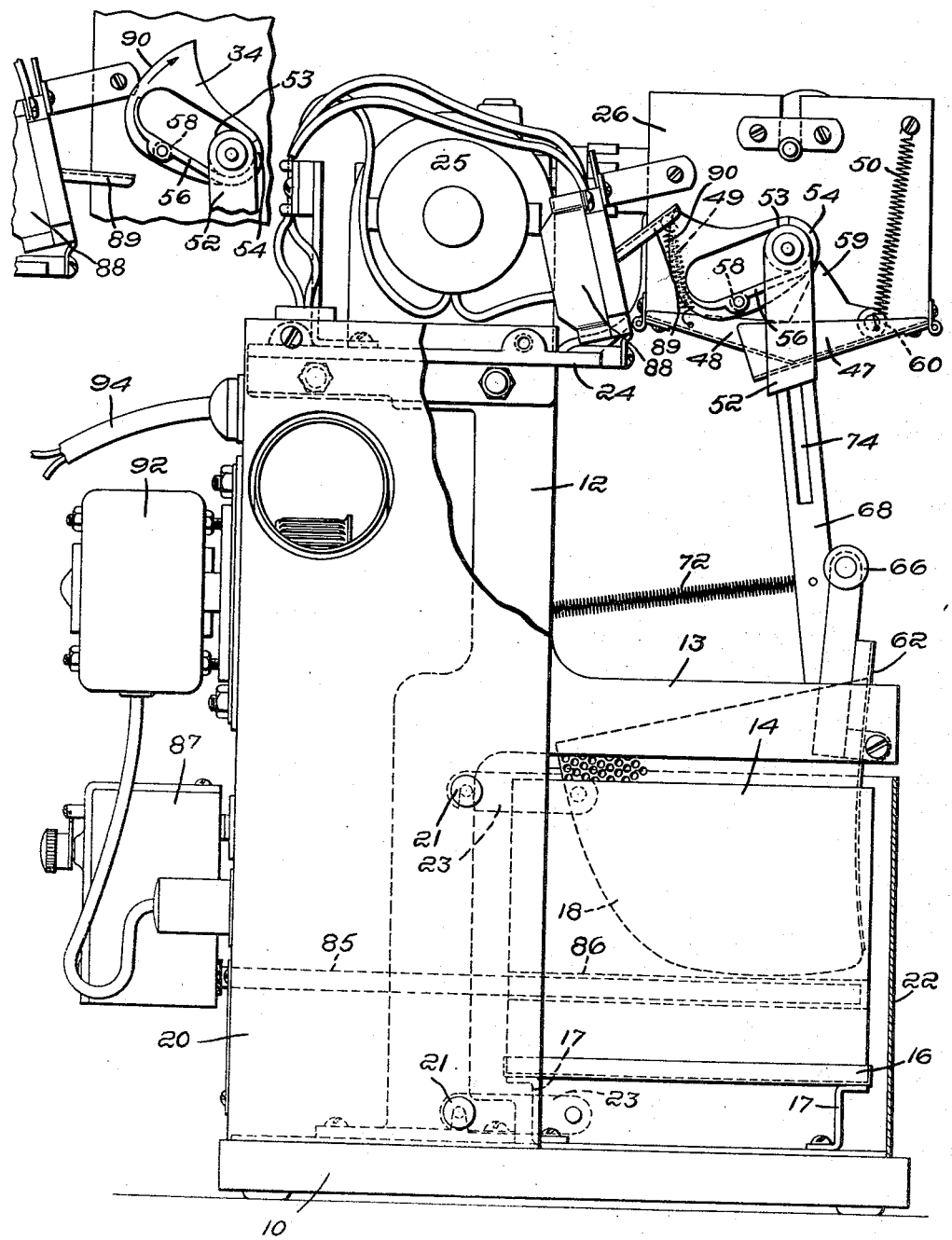

May 19, 1942.  H. M. HUSK  2,283,256
COOKING MACHINE
Filed May 18, 1939  4 Sheets-Sheet 3

Inventor:
Harry M. Husk,
by Kenway & Witter
Attorneys

May 19, 1942.  H. M. HUSK  2,283,256
COOKING MACHINE
Filed May 18, 1939  4 Sheets-Sheet 4

Inventor:
Harry M. Husk,
by Kenway & Witter
Attorneys

Patented May 19, 1942

2,283,256

UNITED STATES PATENT OFFICE 2,283,256

COOKING MACHINE

Harry M. Husk, Newburyport, Mass., assignor to Electricooker, Inc., Newburyport, Mass., a corporation of Massachusetts Application May 18, 1939, Serial No. 274,391

8 Claims. (Cl. 53—7)

This invention relates more particularly to cooking machines of the continuously operating type, that is, machines employing a hopper and means cooperating therewith and with a cooking mechanism for automatically delivering measured batches of uncooked material from the hopper to the cooking mechanism synchronously as such mechanism automatically cooks the batches and discharges them in cooked condition, and the primary object of the invention is the development of an improved and more compact machine of this nature and of novel mechanism adapted for use and cooperation therewith. More specifically, my improved machine and its principle of operation are based on the cooking machine disclosed in Reissue Patent No. 20,570 dated December 7, 1937, and one object of the invention is to simplify and improve that machine.

These cooking machines employ oil as a cooking medium and are used largely in stores and shops in full view of the public for cooking nut meats, and sanitary requirements as well as public opinion demand that the machines shall be frequently and thoroughly cleaned, preferably at the end of each day, and kept in clean and attractive condition. Accordingly, an object of my invention resides in a reconstruction of the said patented machine whereby rendering it more compact, more attractive, and more easily assembled and disassembled, particularly to facilitate easy cleaning. A further object resides in novel construction of the heating unit whereby better to control the heating of the cooking liquid, and in improved and simplified means for operating the mechanism which discharges the cooked product and delivers measured batches of the uncooked product to the cooking bath.

Figure 6:
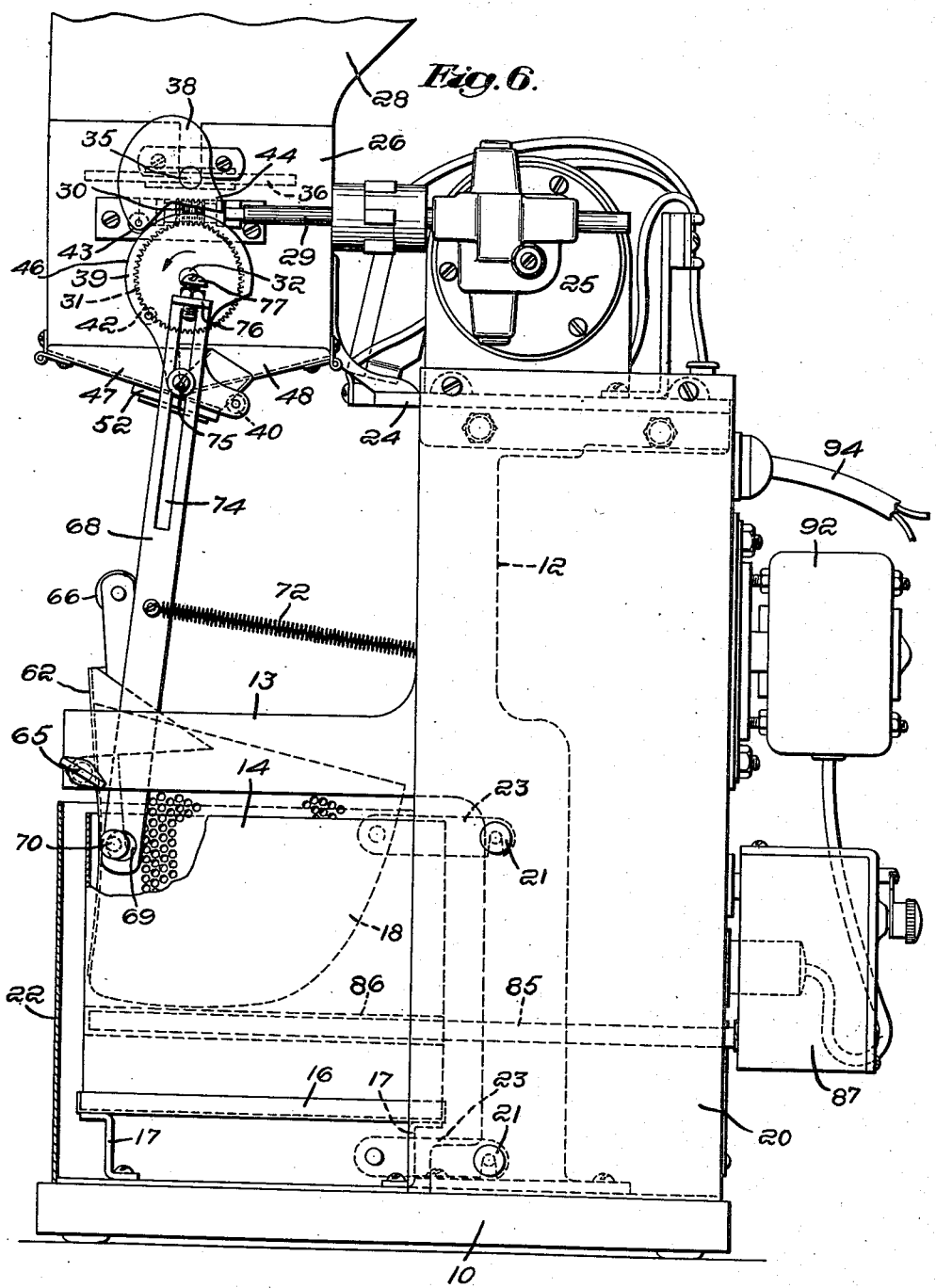
Figure 8:
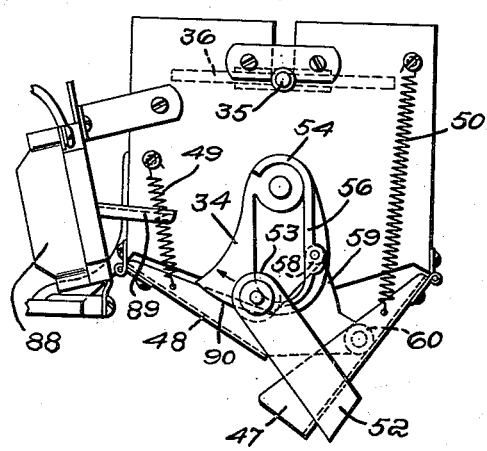
Figure 7:
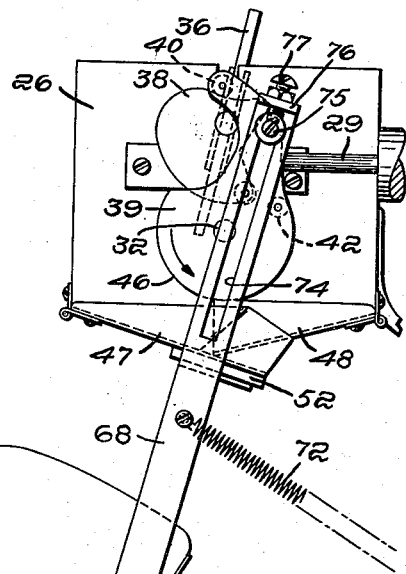
Figure 9:
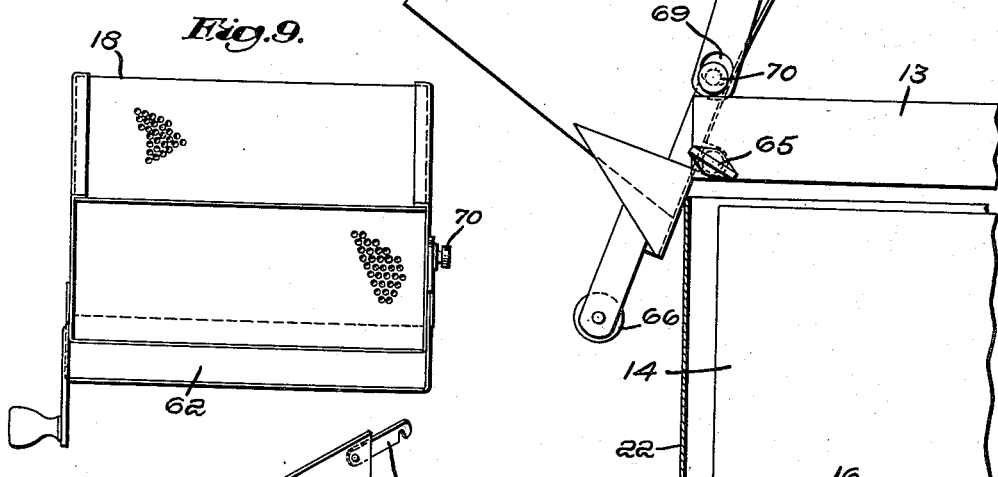
Figure 10:
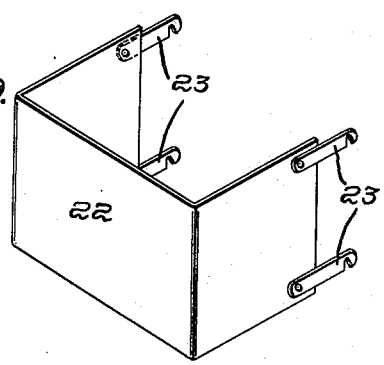

These and other features of the invention will be best understood and appreciated from the following description of preferred embodiments thereof selected for purposes of illustration and shown in the accompanying drawings in which, Fig. 1 is a front elevation of my improved machine, Fig. 2 is a perspective view of the cooking tank and heating unit, the tank being partially broken away, Fig. 3 is a fragmentary view of the heating unit and its support, Fig. 4 is an elevation of the left side of the machine, Fig. 5 is a fragmentary view thereof with moving parts in another position, Fig. 6 is an elevation of the right side of the machine, Fig. 7 is a fragmentary view thereof with the cooking basket in the discharging position, Fig. 8 is a fragmentary view of Fig. 4 showing the hopper gates open to discharge a fresh batch into the cooking basket, Fig. 9 is a front view of the basket in the position of Fig. 7, and Fig. 10 is a perspective view of the front housing unit.

Referring more specifically to the drawings by reference characters, 10 indicates the base of the machine on which are supported two spaced uprights 12 having integral therewith two forwardly extending arms 13. A rectangular tank or container 14 for the cooking liquid is of a length to fit between the uprights, and two rails 16 carried by brackets 17 are adapted to receive and support the tank in cooking position beneath and between the arms 13. The product is cooked in a foraminous basket 18 pivotally movable from a cooking position within the tank (Fig. 6) to a discharging position without the tank (Fig. 7). The rear half of the machine may be enclosed within a U-shaped housing 20 secured to the uprights by screws 21, and a U-shaped housing 22 may be provided at the front half of the machine and secured in place by links 23 engaging the screws 21.

Mounted on the top ends of the uprights is a platform 24 in turn supporting a motor 25 and an apparatus 26 for delivering to the basket 18 and container 14 measured quantities of material to be cooked, this apparatus being located directly over the container and being provided with a hopper 28. The apparatus 26 is driven from the motor through connections including a shaft 29 having a worm 30 thereon in mesh with a worm wheel 31 on a shaft 32 carried on the walls of the apparatus. This shaft extends through the apparatus and has a member 34 mounted on its other end.

The apparatus 26 provides a measuring chamber therein and mounted within the top portion of this chamber on a shaft 35 is a gate 36. A cam 38 on one end of this shaft is arranged to cooperate with a member 39 on the shaft 32. The member 39 carries two relatively spaced abutments or rollers 40 and 42 arranged to engage different peripheral portions of the cam and rotate the gate first in one direction to the open position of Fig. 7 and then back to the closed position of Fig. 6. The cam is provided with spaced abutments 43 and 44 thereon cooperating with the concentric periphery 46 of the member 39 for holding the gate in closed position.

The bottom end of the chamber is normally closed by a pair of cooperating gates 47 and 48 pivoted at their outer ends, the gate 47 overlapping the gate 48. Springs 49 and 50 normally draw the gates to closed position and the gates are drawn and held positively to the closed position by a bracket 52 carried by the gate 47 and having a roll 53 arranged to be engaged by a cam track on the member 34, this cam track having a concentric portion 54 and a non-concentric portion 56. The member 34 carries a roll 58 arranged to engage a cam lug 59 on the gate 48 whereby to open this gate, the gate 48 also carrying a roll 60 for thereupon engaging and opening the gate 47. The cam track 54 ends at a point permitting such opening of the gates and, when the roll 60 passes the apex of the lug 59, the cam track 56 and springs 49 and 50 operate to close the gates to the position of Fig. 4 whereafter the cam track 54 holds them positively closed.

The basket 18 is of a perforated or foraminous structure except for a continuous strip 62 along its front edge portion, this portion being continuous to prevent dripping when dumping the cooked product. The basket is mounted for pivotal movement on two pins 63 and 64 threaded into the uprights. The pin 64 is provided with a knob 65 whereby the pin can be rotated rearwardly to release the basket. The basket can be manually pivoted by means of a handle 66 but in the normal operation of the machine it is pivoted from the motor through a connecting link 68. This link has an oversize opening 69 at its bottom end for engaging over a stud 70 carried by the basket, a spring 72 normally drawing the link rearward to maintain the stud connection and swing the basket inwardly. The top portion of the link is slotted at 74 and this slot is engaged over a stud 75 carried by the member 39. The top end 76 of the link is bent to a right angular position and a screw 77 threaded thereinto is adapted to engage the stud 75. The dumping position of the basket (Fig. 7) can be varied by adjusting the screw.

The cooking liquid is heated by an electric heating unit having a bottom horizontal portion 78 and two upwardly extending end portions 79 provided with a connecting socket 80 adapted to receive a plug 81. The unit is supported in the container by a clamp 82 adapted to engage the top edge of the container, a clamp screw 83 being provided for securing the clamp in place on the container. The clamp holds the heating unit spaced from the bottom of the container and this spacing may be varied by releasing the screws 84 and sliding the end portions 79 up or down in the clamp.

The several operations of the machine are under the control of a thermostat 85 extending into an open tube 86 having its ends sealed to the container walls. A controlling switch within a box 87 and operated by the thermostat, together with the electrical connections, all of which form no part of this invention, are disclosed in detail in Reissue Patent No. 20,570. Cooperating with this switch is an auxiliary switch 88 having a switch arm 89 positioned to be engaged by a cam track 90 on the member 34, movement of the switch arm to the position of Fig. 4 serving to change the circuit and stop the motor. A motor and fan for exhausting cooking fumes may be provided at 92.

The operation of the machine is substantially as follows. The hopper is filled with material, such as nut meats, to be cooked and electric power is supplied to the machine at 94. With the parts in the position of Figs. 4 and 6, electric energy will be delivered to the heater 78 and when the cooking liquid in the container 14 reaches a predetermined temperature the motor will operate through a period bringing the basket to the dumping position of Fig. 7 and returning it and the other parts to the position of Figs. 4 and 6. This movement rotates the member 39 in the direction of the arrow whereby pivoting the basket outwardly and engaging the roll 40 with the cam 38 in a manner rotating the gate 36 to the open position of Fig. 7. The measuring chamber at 26 is thereupon filled from the hopper. Continued rotation of the member 39 causes its roll 42 to engage the cam 38 and rotate the gate back to the closed position of Fig. 6. Continued rotation of the shaft 36 then causes the roll 58 (Fig. 4) to engage the edge 59' of the cam lug 59 and open the gates 47 and 48 to the position of Fig. 8, whereupon the measured quantity of material is discharged into the basket within the container. The motor then continues to rotate until the cam track 90 (Figs. 4 and 5) moves the switch arm 89 to the position of Fig. 4 which breaks the motor circuit. During this last movement the cam tracks 54 and 56 engage the roll 53 and positively move and hold the gates 47 and 48 to and in the closed position of Fig. 4. The parts then remain idly in this position until the heating unit has brought the cooking liquid up to the predetermined temperature, this being the cooking period and the batch being cooked when this temperature is reached, whereupon the above described operations are repeated, all as more specifically described in said Reissue Patent No. 20,570.

Having thus described my invention what I claim as new and desire to secure by Letters Patent of the United States is:

1. In a cooking machine, a base, two uprights thereon, a container for a cooking liquid, a foraminous basket, a pair of pivot elements carried by the uprights at opposite sides of the basket and in position to support the basket for pivotal movement to and from a cooking position within and dumping position without the container, and means mounting one of said elements for convenient retraction whereby to render the basket readily removable from the machine.

2. The machine defined in claim 1 plus means above the container for delivering to the basket and container measured quantities of material to be cooked, a link extending downwardly from said means and having a readily detachable connection with the basket, and means including an electric motor for operating the delivering and measuring means and the link in synchronism to pivot the basket to dumping position and deliver measured quantities of said material to the basket when the basket is returned to the container, said detachable connection and retracting pivot element permitting convenient removal of the basket from the machine.

3. In a cooking machine a container for a cooking liquid, a foraminous basket, detachable means mounting the basket for pivotal movement to and from a cooking position within and a dumping position without the container, means above the container for delivering to the basket and container measured quantities of material to be cooker, means including a rotary element for operating the measuring and delivering means, a crank pin carried by the element, a downwardly extending link having at its lower end a readily detachable connection with the basket and having a slot in and extending longitudinally of its upper end and engaging over the crank pin, and a member carried by the upper end of the link in position to engage the crank pin and adjustable toward and from the crank pin for varying the dumping position of the basket through operation of the link.

4. In a cooking machine, a hopper for material to be cooked, means providing a measuring chamber beneath and cooperating with the hopper, a gate in the chamber, a shaft supporting the gate, a cam on the shaft outside of the chamber, a rotary member adjacent to the cam, and two relatively spaced abutments carried by the rotary member in position to engage in sequence different peripheral portions of the cam and effect rotation of the shaft in one direction and opening of the gate during one period of each rotation of the member and effect rotation of the shaft in the other direction and closing of the gate during a subsequent period of the same rotation of the member, the member and cam having cooperating portions holding the gate closed during the remaining period of each rotation of the member.

5. In a cooking machine, a hopper for material to be cooked, means providing a measuring chamber beneath and cooperating with the hopper, a pair of cooperating gates closing the bottom of the chamber when in closed position, a shaft, means operated by the shaft for delivering a measured quantity of the material to the chamber during one period of each rotation of the shaft and while the gates are closed, means operated by the shaft during a subsequent rotary period thereof for opening the gates, and means including a cam carried by the shaft for thereafter closing the gates and holding them closed during the next delivery of material to the chamber.

6. The machine defined in claim 5 in which one of said gates overlaps the other when the gates are in closed position and in which the last named means includes a bracket carried by the outer overlapping gate and means on the bracket cooperating with the cam for closing the gates and holding them in closed position.

7. The machine defined in claim 5 plus an electric motor for operating said shaft, a switch for controlling the operation of the motor, and a single member on the shaft providing said gate closing and holding cam and a second cam for operating the switch at each rotation of the shaft.

8. The machine defined in claim 5 plus an electric motor for operating said shaft, a switch for controlling the operation of the motor, a member on the shaft having a cam track cooperating with an element of the switch for operating the switch at each rotation of the shaft and a second cam track on the member serving as said gate closing and holding cam, said second cam track having a non-concentric portion for cooperating with a cam follower to close the gates and having a concentric portion for cooperating with the follower to hold the gates positively in closed position.

HARRY M. HUSK.